United States Patent [19]
Weingarten et al.

[11] 4,056,553
[45] Nov. 1, 1977

[54] 3-AMINO-4-CARBOALKOXY-BENZOIC ACID 4'-PHENOXY-ANILIDES

[75] Inventors: Friedrich Wilhelm Weingarten, Liederbach, Taunus; Klaus Hunger, Kelkheim, Taunus, both of Germany

[73] Assignee: Hoechst Aktiengesellschaft, Frankfurt am Main, Germany

[21] Appl. No.: 686,008

[22] Filed: May 13, 1976

[30] Foreign Application Priority Data

May 15, 1975 Germany .............................. 2521649

[51] Int. Cl.$^2$ ............................................ C07C 103/78
[52] U.S. Cl. ...................................... 560/43; 260/203; 260/645
[58] Field of Search ............................ 260/471 R, 203

[56] References Cited
U.S. PATENT DOCUMENTS 2,808,433  10/1957  Struve .................................. 260/518

Primary Examiner—Donald G. Daus
Assistant Examiner—Lisa Jones
Attorney, Agent, or Firm—Curtis, Morris & Safford

[57] ABSTRACT

3-Amino-4-lower carboalkoxy-benzoic acid-4'-phenoxy-anilides which may be halogenated in the phenoxy nucleus are obtained by reacting the corresponding 4-carboalkoxy-benzoyl chlorides having in 3-position a group capable of yielding the amino group with a 4-amino-diphenyl ether which may be halogenated in the phenyl nucleus which is not substituted by the amino group, and setting free the amino group from the group capable of yielding it. The products are diazo components for azo pigments, especially of the 2-hydroxy-3-naphthoic acid arylide type.

8 Claims, No Drawings

3-AMINO-4-CARBOALKOXY-BENZOIC ACID 4'-PHENOXY-ANILIDES

CROSS REFERENCE TO RELATED APPLICATION

The preparation of azo pigments from the amines described and claimed herein is described and claimed in copending application Ser. No. 686,031 of the same filing date, of Klaus Hunger and Friedrich Weingarten, corresponding to and claiming priority of German Patent, Application Ser. No. P 25 21 655.1 of May 15, 1975.

The present invention relates to 3-amino-4-carboalkoxy-benzoic acid 4'-phenoxy-anilides of the general formula I

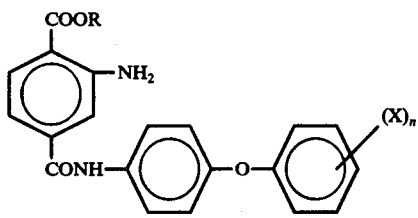

in which R stands for the methyl or ethyl group, X stands for identical or different halogen atoms, especially chlorine or bromine atoms, and n stands for zero or an integer of from 1 to 4; as well as to a process for the preparation thereof, which comprises condensing a 4-carboalkoxy-benzoyl chloride of the general formula II

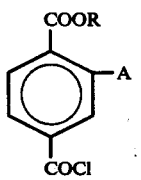

in which R is defined as above, and A stands for a group capable of being converted into an amino group, such as the nitro or an acylamino group, for example, an acetylamino group, with a 4-aminodiphenyl ether of the formula III

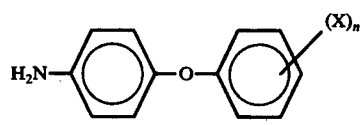

in which X and n are defined as above, for example, according to the Schotten-Bauman reaction and then converting the group A into the amino group, for example, by reducing the nitro group or hydrolizing the acylamino group.

The condensation reaction is preferably carried out in the presence of an acid-binding agent, i.e. an inorganic or organic base, for example, an alkali metal acetate, carbnate or hydrogenocarbonate, or an organic amine preferably an aromatic heterocyclic amine, especially pyridine. The condensation is generally carried out at temperatures of from 20° to 200° C, preferably of from 50° to 150° C, in particular from 70° to 120° C, optionally in the presence of an inert solvent, preferably an aromatic solvent such as toluene, a chlorinated benzene or a benzoic acid lower alkyl ester.

The 4-amino diphenyl ethers of the general formula III may be prepared, for example, by reacting alkali metal phenolates of the general formula IV

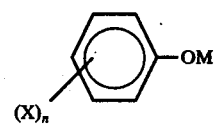

in which X and n are defined as above, and M stands for a potassium or sodium atom, with p-nitrochlorobenzene in the presence of phenol or an organic solvent, for example, dimethylformamide or dimethylsulfoxide, and then reducing the nitro group. As 4-aminodiphenyl ethers there may be used, for example: 4-Aminodiphenyl ether, 4-amino-4'-chlorodiphenyl ether, 4-amino-2',3'-dichlorodiphenyl ether, 4-amino-2',4'-dichlorodiphenyl ether, 4-amino-2',5'-dichlorodiphenyl ether, 4-amino-2',4',5'-trichloro-diphenyl ether, 4-amino-2',3',4',5'-tetrachlorodiphenyl ether, 4-amino-2'-bromodiphenyl ether or 4-amino-4'-bromodiphenyl ether.

The 4-carboalkoxy-benzoyl chlorides of the general formula II may be prepared, for example, by partial hydrolysis of the nitroterephthalic acid dialkyl esters and subsequent reaction of the resulting 3-nitro-4-carboalkoxy-benzoic acids with the usual reactants for the preparation of acid chlorides, for example, thionyl chloride or phosphorus oxytrichloride.

In an analogous manner, the 3-acylamino-4-carboalkoxy-benzoic acids are converted into the acid chlorides. In this case, the "acyl" group preferably means the benzoyl group or an alkanoyl group of 2 to 5 carbon atoms, especially the acetyl group.

The compounds resulting from the condensation of the acid chlorides of formula II with the amines of formula III are converted into the corresponding 3-amino-4-carboalkoxy-benzoic acid 4'-phenoxy anilides either by treating the N-acyl group with an acid or a base or by reducing the nitro group, for example, with metals, such as iron or zinc, or tin(II) salts, preferably by hydrogenation under pressure in the presence of a nickel catalyst at temperatures of from 20° to 200° C, preferably from 50° to 150° C.

The compounds of the invention are obtained with a good yield and purity. If required, they can be regrystallized from a variety of solvents, for example, alcohols, benzene, toluene or glacial acetic acid.

The new 3-amino-4-carboalkoxy-benzoic acid 4'-phenoxy anilides are valuable diazo components. In particular, they can be coupled in their diazotized form, for example, with 2-hydroxy-3-naphthoic acid anilide derivatives to yield azo pigments which are distinguished by clear shades and very good fastness properties, especially to light and migration. Such coupling components are disclosed in German Pat. No. 1,644,191 corresponding to U.S. Pat. No 3,321,458.

The following Examples illustrate the invention, the parts and percentages being by weight unless stated otherwise. The ratio of part by weight to part by volume is the same as that of the kilogram to the liter.

EXAMPLE 1

450 Parts of 3-nitro-4-carbomethoxy-benzoic acid were dissolved in 1,000 parts by volume of chlorobenzene. The ester was freed of water by distilling off azeotropically about 100 parts by volume of chlorobenzene. While adding 10 parts by volume of dimethylformamide that had been dried previously, 260 parts (158 parts by volume) of thionyl chloride were added dropwise at 70° C. After 4 to 5 hours, excess thionyl chloride with small amounts of chlorobenzene was eliminated in a water jet vacuum.

374 Parts of 4-aminodiphenyl ether were dissolved at 80° C in 500 parts by volume of chlorobenzene and 160 parts by volume of pyridine. Within 3 hours, the acid chloride that had been dissolved in chlorobenzene was added, and the mixture was heated to 100° C for a short time. It was then placed on 4,000 parts by volume of a 2% sodium carbonate solution. On cooling the product precipitated. Chlorobenzene and pyridine were eliminated by means of steam. After suction-filtration and drying, the yield was 620 parts of the compound of the formula

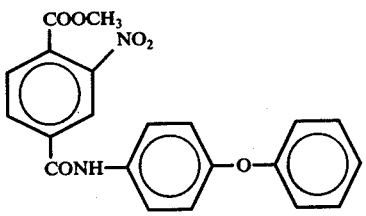

Melting point: 146° to 148° C.

256 Parts of this 4-(3'-nitro-4'-carbomethoxy- benzoylamino)-diphenyl ether were hydrogenated in 1,500 parts by volume of ethanol with an addition of 15 parts of a nickel catalyst supported on kieselguhr at 50° C and under a pressure of 50 bar within 3 hours. The hot solution was suction-filtered, and the amine in the filtrate as cautiously precipitated by adding water. The precipitate was suction-filtered. After drying, the product of the formula

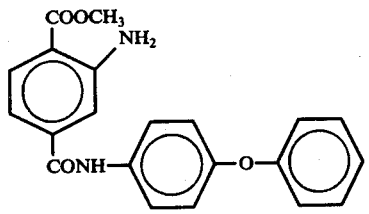

could be recrystallized from ethanol, benzene or glacial acetic acid.

Yield: 70%, m.p. 172° to 175° C.

EXAMPLE 2

105 parts of 4-amino-4'-chlorodiphenyl ether were dissolved at 70° to 80° C in a mixture of 100 parts by volume of toluene and 50 parts by volume of pyridine. While stirring, 122 parts of 3-nitro-4-carbomethoxy-benzoyl chloride were added dropwise. After about 4 hours, the reaction was complete. The mixture was placed on 2,000 parts by volume of a 2% sodium carbonate solution, and toluene and pyridine were distilled off with steam. After drying, the yield was 190 parts; m.p. 134° C.

190 parts of this 4-(3"-nitro-4"-carbomethoxy-benzoylamino)-4'-chlorodiphenyl ether were hydrogenated within 3 hours in 2,000 parts by volume of ethanol with an addition of 12 g of a nickel catalyst (RCH 55/5; of Ruhrchemie) and 20 g of sodium acetate at 50° C and a pressure of 70 bar.

After work-up as in Example 1, the yield was 134 parts of a compound of the formula

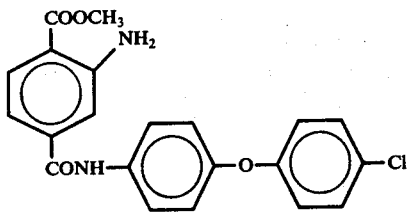

Melting point: 170° to 175° C.

EXAMPLE 3

At a temperature which rose from 75° to 120° C, 67 parts of potassium hydroxide (of 86% strength) were introduced portionwise into 171 parts of 2,5-dichlorophenol. Stirring was continued for 1 to 2 hours to complete the reaction. At 90° C, 157 parts (125 parts by volume) of 4-chloronitrobenzene were added dropwise within 2 hours, whereupon the temperature rose to 135° C. After a total of 4 hours, the contents of the flask was poured onto 500 parts by volume of a 2% sodium hydroxide solution and carefully stirred at 90° C for 1 hour. The aqueous top layer was separated and washed several times with water. The mixture was then cooled to 30° to 40° C, whereupon the product solidified in the form of granules. The washing water's pH was adjusted to 1. The precipitated 4-nitro-2',5'-dichlorodiphenyl ether was suction-filtered and could be recrystallized from ethanol. (M.p. 96° C, yield: 88%)

150 parts of iron files were introduced into 400 parts by volume of glacial acetic acid. The mixture was heated to 80° C, and 152 parts of the 4-nitro-2',5'-dichlorpdiphenyl ether were introduced portionwise. The temperature was then raised to 105° to 110° C, and thus the reduction was carried out.

After 3 hours, the contents of the flask was suction-filtered while hot. The same amount of water was added to the filtrate, whereupon the aminodiphenyl ther precipitated. It was separated by suction-filtration and dried. (M.p. 72° to 74° C)

In a mixture of 300 parts by volume of chlorobenzene and 30 parts by volume of pyridine, 70 parts of 2',5'-dichloro-4-aminodiphenyl ether were dissolved at 80° C. While stirring, 70 parts of 3-nitro-4-carbomethoxy-benzoyl chloride dissolved in chlorobenzene were added dropwise. After about 4 hours, condensation was complete. After the mixture had been cooled to about 90° C, it was placed on 1,000 parts by volume of a 3% sodium carbonate solution, and chlorobenzene and pyridine were eliminated by steam distillation.

Yield of nitro compound after drying: 76 parts; m.p. 78° C. 37 parts of this 4-(3"-nitro-4"-carbomethoxy-benzoylamino)-2',5'-dichlorophenyl ether were introduced into 380 parts by volume of glacial acetic, acid, and the mixture was heatd to 80° C. 38 Parts of iron files were introduced within 1 hour, while the temperature rose and was maintained at 105° to 110° C for 3 hours. The product was worked up as in Example 2.

Yield: 30 parts of a compound of the formula

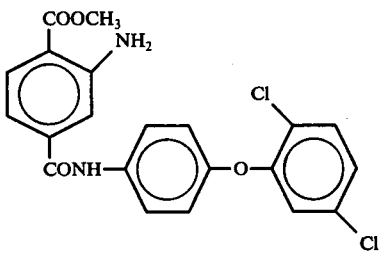

Melting point: 217° C.

EXAMPLE 4

100 Parts of 2,4,5-trichlorophenol were melted at 80° C. While stirring, 30 parts of potassium hydroxide were introduced within 2 hours at 80° to 120° C. 81 parts (62.5 parts by volume) of 4-chloronitrobenzene were added dropwise at 90° C, whereupon the temperature was raised to 150° C after this addition. The reaction was complete within 4 to 5 hours.

After cooling to 90° C, the contents of the flask was poured with stirring onto 500 parts by volume of a 3% sodium hydroxide solution. The aqueous top layer was separated and stirred several times with water until neutral. On further cooling to 30° to 50° C, the product was obtained in granules. After having been acifidied to pH 1, it was suction-filtered. Further purification could be performed by vacuum distillation. The nitro ether thus obtained was recrystallized from ethanol and had a melting point of 103° to 105° C; the yield was 120 parts.

140 parts of 2',4',5'-trichloro-4-nitrodiphenyl ether were stirred into 800 parts by volume of ethanol. After the mixture had been heated to 50° C, 330 parts of iron file were introduced, and 78 parts by volume of concentrated hydrochlorid acid were added. The reduction was complete within 5 hours. The mixture was then neutralized by means of 32% aqueous ammonia, another 1,200 parts by volume of ethanol were added, and the mixture was concentrated in vacuo until crystallization began. The crystal suspension was then stirred into 2,000 parts by volume of dilute hydrochloric acid until a strongly acidic reaction occurred (pH 1 to 2). The product was suction-filtered and the filtrate was rendered akaline, whereupon the amine precipitated. After cooling to 0° to 10° C, the precipitate was suction-filtered and dried, then recrystallized from benzene. The resulting 2',4',5'-trichloro-4-aminodiphenyl ether had a melting point of 168° C.

In a mixture of 200 parts by volume of chlorobenzene and 20 parts by volume of pyridine, 28 parts of 2',4',5'-trichloro-4-aminodiphenyl ether were dissolved at 80° C. While stirring, 24 parts of 3-nitro-4-carbomethoxy-benzoyl chloride dissolved in chlorobenzene were added dropwise.

After 4 to 5 hours the reaction was complete. At 90° C, the mixture was placed into 1,000 parts by volume of a 2% sodium carbonate solution, and chlorobenzene and pyridine were eliminated by steam distillation. The yield of the nitro compound after drying amounted to 34 parts.

100 Parts of tin(II)chloride (crystallized with 2 mols of water) were portionwise added to 300 parts by volume of concentrated hydrochlorid acid and dissolved therein while heating to 100° C. To this solution, 38 parts of 4-(3''-nitro-4''-carbomethoxy-benzoylamino)- 2',4',5'-trichlorodiphenyl ether dissolved in 200 parts by volume of ethanol were added. After another 2 hours, the product was cooled and suction-filtered. The residue was stirred into 1,000 parts by volume of a 6% potassium hydroxide solution. The precipitate was again suction-filtered and washed until neutral to yield an amine of the formula

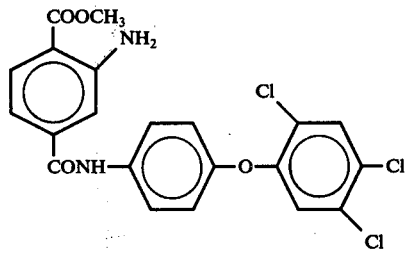

which was recrystallized from chlorobenzene and showed a melting point of 198° to 200° C.

The following compounds can also be prepared according to the methods given in Examples 1 to 4:

TABLE

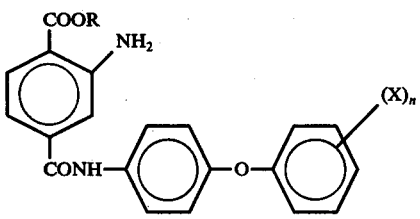

| Example | R | $X_1$ | $X_2$ | $X_3$ | $X_4$ |
|---|---|---|---|---|---|
| 6 | $C_2H_5$ | H | H | H | H |
| 7 | $CH_3$ | Cl | Cl | H | H |
| 8 | $CH_3$ | Br | H | H | H |
| 9 | $CH_3$ | H | H | Br | H |
| 10 | $C_2H_5$ | Cl | H | Cl | H |
| 11 | $CH_3$ | Cl | Cl | Cl | Cl |

We claim:
1. A compound of the formula wherein R is methyl or ethyl, X stands for equal or different halogen atoms and n is an integer of 1 to 4 or zero.

2. A compound as claimed in claim 1, wherein X is chlorine or bromine.

3. A compound as claimed in claim 1, wherein R is methyl.

4. The compound as claimed in claim 3, wherein n is zero.

5. A compound as claimed in claim 3, wherein X stands for chlorine.

6. The compound as claimed in claim 5, wherein n is 3, the chlorine atoms standing in 2, 4 and 5-positions.

7. The compound as claimed in claim 5, wherein n is 1, the chlorine atoms standing in 4-position.

8. The compound as claimed in claim 5, wherein n is 2, the chlorine atoms standing in 2- and 5-positions.

* * * * *